(12) United States Patent
Inagawa et al.

(10) Patent No.: US 11,668,627 B2
(45) Date of Patent: Jun. 6, 2023

(54) VEHICLE INSPECTION APPARATUS AND VEHICLE INSPECTION METHOD THAT DETECTS ABNORMAL NOISE

(71) Applicant: HONDA MOTOR CO., LTD., Tokyo (JP)

(72) Inventors: Toshinori Inagawa, Saitama (JP); Susumu Akutsu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 17/165,035

(22) Filed: Feb. 2, 2021

(65) Prior Publication Data
US 2021/0239573 A1 Aug. 5, 2021

(30) Foreign Application Priority Data
Feb. 5, 2020 (JP) .............................. JP2020-017522

(51) Int. Cl.
*G01M 17/007* (2006.01)
*G01M 17/013* (2006.01)
*G01M 7/08* (2006.01)

(52) U.S. Cl.
CPC .......... *G01M 17/0078* (2013.01); *G01M 7/08* (2013.01); *G01M 17/013* (2013.01)

(58) Field of Classification Search
CPC .............................. G01M 7/022; G01M 7/025
See application file for complete search history.

(56) References Cited

U.S. PATENT DOCUMENTS 5,551,298 A * 9/1996 Rayment ........... G01M 17/0078
73/579
2018/0252618 A1* 9/2018 Oblizajek ........... G01M 17/007

FOREIGN PATENT DOCUMENTS

| JP | S47-002881 | 1/1972 |
| JP | 2008-267871 A | 11/2008 |
| JP | 2017-009545 | 1/2017 |

OTHER PUBLICATIONS

Japanese Office Action dated Nov. 2, 2021, 2 pages.

* cited by examiner

*Primary Examiner* — Eric S. McCall
*Assistant Examiner* — Timothy P Graves
(74) *Attorney, Agent, or Firm* — Rankin, Hill & Clark LLP

(57) ABSTRACT

A vehicle inspection apparatus includes: an exciter roller (3) configured to apply vibration to a vehicle (6); a control device 5 configured to control the exciter roller (3); and a vibration setting unit (the control device (5)) configured to set a vibration that is input to a wheel (7) of the vehicle (6) when abnormal noise generated in the vehicle (6) is detected. The control device (5) provides a range of vibrations including the vibration set by the vibration setting unit and applies the range of vibrations to the vehicle (6).

2 Claims, 2 Drawing Sheets

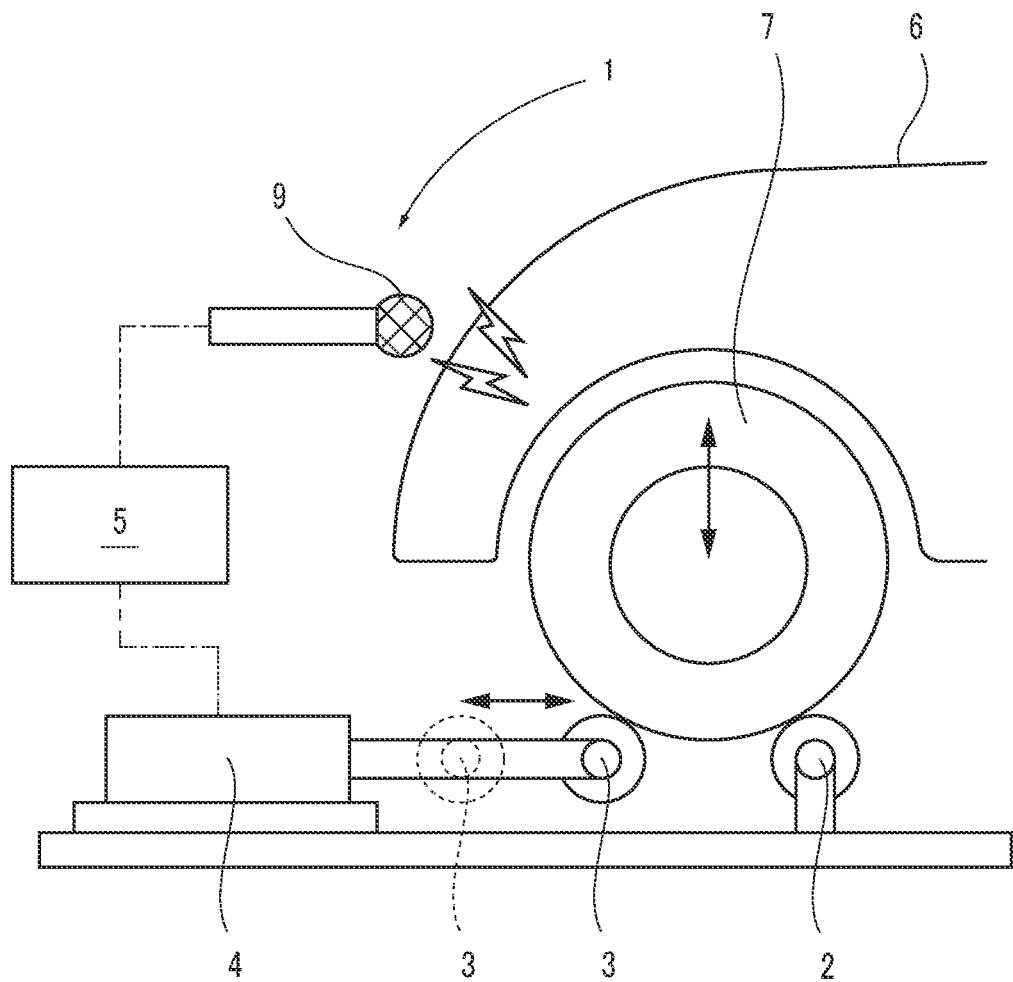

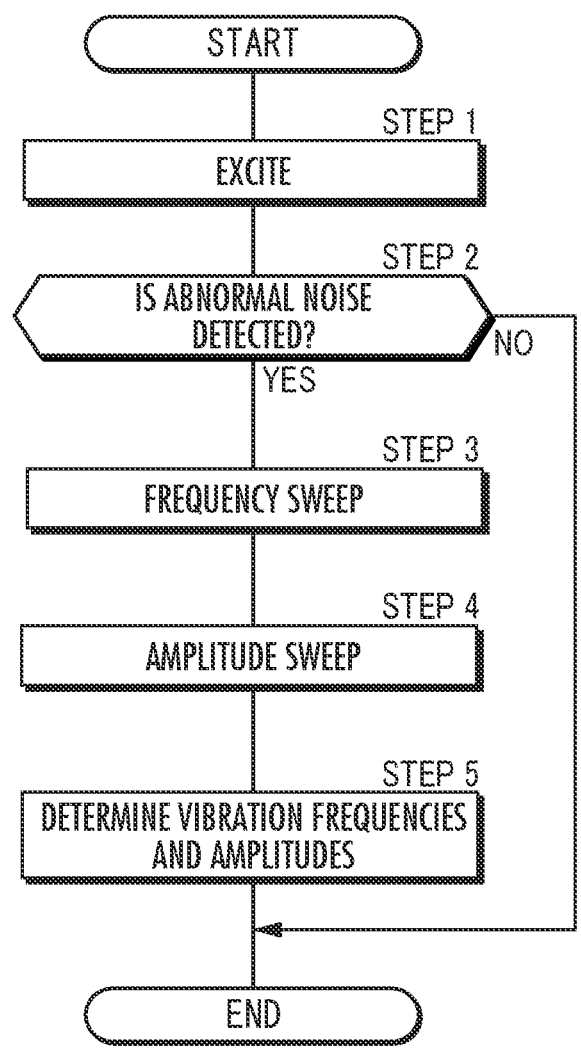

VEHICLE INSPECTION APPARATUS AND VEHICLE INSPECTION METHOD THAT DETECTS ABNORMAL NOISE

BACKGROUND OF THE INVENTION

Field of the Invention

The present invention relates to a vehicle inspection apparatus and a vehicle inspection method.

Description of the Related Art

It has conventionally been known to perform inspection by using an excitation apparatus to apply vibration to the wheels of a vehicle and seeing if abnormal noise is detected from the vehicle (Japanese Patent Laid-Open No. 2017-009545, for example).

In some cases, even when abnormal noise was detected, occurrence conditions of the abnormal noise could not be identified because situations in which the abnormal noise was generated could not be reproduced due to factors such as difference in experience between inspectors and change in state of the vehicle (temperature change, change in relative positions of components due to distortion from traveling of the vehicle, and shifting of components' fitting positions).

In view of the foregoing, an object of the present invention is to provide a vehicle inspection apparatus and a vehicle inspection method that can make identification of the occurrence conditions of abnormal noise easier than conventional apparatuses and methods.

SUMMARY OF THE INVENTION

1. To attain the object described above, a vehicle inspection apparatus (which may be, for example, a vehicle inspection apparatus 1 of the present embodiment, which applies to other occurrences of the term vehicle inspection apparatus below) according to the present invention comprises:
an excitation unit (which may be, for example, an exciter roller 3 of the present embodiment, which applies to other occurrences of the term excitation unit below) configured to apply vibration to a vehicle (which may be, for example, a vehicle 6 of the present embodiment, which applies to other occurrences of the term vehicle below); a control device (which may be, for example, a control device 5 of the present embodiment, which applies to other occurrences of the term control device below) configured to control the vibration applied by the excitation unit; and
a vibration setting unit (which may be, for example, the control device 5 of the present embodiment, which applies to other occurrences of the term vibration system unit below) configured to set a vibration that is input to a wheel of the vehicle when abnormal noise generated in the vehicle is detected,
wherein the control device provides a range of vibrations including the vibration set by the vibration setting unit and applies the range of vibrations to the vehicle.

The vehicle inspection apparatus according to the present invention can not only detect abnormal noise but also facilitate identification of the cause of the abnormal noise by providing for re-input a range of vibrations including the vibration that is input to the vehicle when the abnormal noise is generated.

2. In an aspect of the present invention, the vibration set by the vibration setting unit is set using a frequency and an amplitude, and the control device provides a range of frequencies including the frequency and a range of amplitudes including the amplitude to provide the range of vibrations.

3. To attain the object described above, a vehicle inspection method according to the present invention comprises:
a vibration setting step of setting a vibration that is input to a wheel of a vehicle when abnormal noise generated in the vehicle is detected; and
a sweep vibration step of providing a predetermined range of vibrations including the vibration set in the vibration setting step and applying the range of vibrations to the vehicle.

The vehicle inspection method according to the present invention can not only detect abnormal noise but also facilitate identification of the cause of the abnormal noise by providing for re-input a predetermined range of vibrations including the vibration that is input to the vehicle when the abnormal noise is generated.

4. In an aspect of the present invention, the vibration set in the vibration setting step is set using a frequency and an amplitude, and a range of frequencies including the frequency and a range of amplitudes including the amplitude are provided to provide the range of vibrations in the sweep vibration step.

BRIEF DESCRIPTION OF THE DRAWINGS

FIG. 1 is a schematic diagram for describing an embodiment of a vehicle inspection apparatus according to the present invention; and FIG. 2 is a flowchart for describing the vehicle inspection apparatus and a vehicle inspection method according to the present embodiment.

DETAILED DESCRIPTION OF THE PREFERRED EMBODIMENT

An embodiment of a vehicle inspection apparatus and a vehicle inspection method according to the present invention is described below with reference to the drawings. A vehicle inspection apparatus 1 according to the present embodiment comprises: a stationary roller 2; an exciter roller 3 disposed parallel to the stationary roller 2; an exciter actuator 4 that hydraulically moves the exciter roller 3 forward and backward in a horizontal direction; and a control device 5 that can receive two types of data: a forward/backward stroke length and a forward/backward velocity by which the exciter actuator 4 moves the exciter roller 3 forward and backward. Hereinafter, in the present embodiment, the forward/backward stroke length may be referred to as excitation amplitude, and the forward/backward velocity as excitation frequency.

A wheel 7 of a vehicle 6 is placed on the stationary roller 2 and the exciter roller 3. By causing the exciter roller 3 to produce forward/backward motion toward the stationary roller 2, force is applied to the wheel 7 so as to lift the wheel 7 upward, vibrating the vehicle 6. By controlling respective excitation applied to four wheels 7 by corresponding exciter rollers 3, various vibrations, as controlled in the pitch, roll, and yaw directions, can be applied to the vehicle 6.

The vehicle inspection apparatus 1 also comprises a microphone 9 that converts a sound to an electrical signal, which is transmitted to the control device 5. The control device 5 comprises an electronic control unit comprising a CPU, a memory, and other components. The control device 5 is configured to transmit a control signal to the exciter actuator 4 and to determine present control information for the exciter actuator 4 (an instruction signal indicative of the forward/backward stroke length or excitation amplitude, and of the forward/backward velocity or excitation frequency) as appropriate. That is, in the present embodiment, the control device 5 serves as a vibration setting unit.

In the vehicle inspection apparatus 1 according to the present embodiment, a stationary roller 2, an exciter roller 3, and an exciter actuator 4 are placed per each of the four wheels 7 of the vehicle 6. Thus, by transmission of an instruction signal indicative of the forward/backward stroke length (excitation amplitude) and the forward/backward velocity (excitation frequency) to each of the four exciter actuators 4 based on a predetermined control pattern, the vehicle inspection apparatus 1 can perform inspection to see if abnormal noise is detected from the vehicle 6.

An operation of the vehicle inspection apparatus 1 according to the present embodiment and a vehicle inspection method according to the present embodiment are described below with reference to FIG. 2. First, in STEP 1, the exciter rollers 3 are caused to produce forward/backward motion with the wheels 7 placed on the respective stationary rollers 2 and exciter rollers 3. Vibrations as applied to the vehicle 6 while traveling on a proving ground can be reproduced by the forward/backward motion of the exciter rollers 3 and applied to the vehicle 6. Then, in STEP 2, a sound picked up by the microphone 9 is analyzed by the control device 5 to determine whether abnormal noise is present. Alternatively, a person may determine whether abnormal noise is present. If abnormal noise is not detected (No in STEP 2), the process is finished. If a value analyzed is different from an analysis value defined in advance by a predetermined value or greater, it is determined that abnormal noise is present (Yes in STEP 2), and a forward/backward velocity (excitation frequency [Hz]) and a forward/backward stroke length (excitation amplitude [m/s$^2$]) of each of the exciter actuators 4 at the point in time when the abnormal noise is detected are stored in a storage device of the control device 5.

The process then proceeds to STEP 3, where the frequency is varied in small increments at a given speed in a predetermined frequency region (plus/minus 3 Hz) with the stored excitation frequency [Hz] at the center to thereby determine whether abnormal noise is generated. If abnormal noise is detected, the detection of the abnormal noise is stored in the control device 5.

Subsequently, proceeds to STEP 4 where an amplitude sweep process is performed, where the forward/backward stroke length (excitation amplitude [m/s$^2$]) of each of the exciter actuators 4 is varied at a given speed with the excitation frequency at which the abnormal noise is detected to thereby determine whether abnormal noise is generated by also varying the excitation amplitudes. If abnormal noise is detected, then proceeds to STEPS and the detection of the abnormal noise is stored in the control device 5. Alternatively, a person can determine whether abnormal noise is present also in STEP 3. STEP 4 and STEP 5.

The vehicle inspection apparatus 1 and the vehicle inspection method according to the present embodiment can not only detect abnormal noise but also facilitate identification of the cause of the abnormal noise by providing a range of frequencies and a range of amplitudes respectively including the frequency and amplitude input to each of the wheels 7 when the abnormal noise is generated.

While the microphone 9 is used as an abnormal-noise detection unit in the present embodiment, the abnormal-noise detection unit of the present invention is not limited to this example. The abnormal-noise detection unit of the present invention can be configured such that, when an inspector, such as a driver, detects abnormal noise, the inspector may press, for example, an abnormal-noise detection button connected to the control device 5 so that the frequencies at which the button is pressed are stored in the control device 5. Alternatively, a person may directly check the presence of abnormal noise.

REFERENCE SIGNS LIST 1 vehicle inspection apparatus
2 stationary roller
3 exciter roller
4 exciter actuator
5 control device
6 vehicle
7 wheel
9 microphone

What is claimed is:

1. A vehicle inspection apparatus comprising:
   a stationary roller;
   an excitation unit configured to apply vibration to a vehicle;
   a control device configured to control the vibration applied by the excitation unit; and
   a vibration setting unit configured to set a vibration that is input to a wheel of the vehicle when abnormal noise generated in the vehicle is detected,
   wherein
   the control device provides a range of vibrations including the vibration set by the vibration setting unit and applies the range of vibrations to the vehicle,
   the vibration set by the vibration setting unit is set using a frequency and an amplitude, and the control device provides a range of frequencies including the frequency and a range of amplitudes including the amplitude to provide the range of vibrations,
   the excitation unit includes an exciter roller and an exciter actuator,
   wherein the exciter roller is movable forward and backward toward the stationary roller by the exciter actuator,
   the control device is configured to change a forward and backward stroke length of the exciter roller to change an excitation amplitude, and to change a forward and backward velocity of the exciter roller to change the excitation frequency, and
   the wheel of the vehicle is placed on the exciter roller and the stationary roller, and vibration is input to the wheel.

2. A vehicle inspection method using a vehicle inspection apparatus, the vehicle inspection apparatus comprising:
   a stationary roller;
   an exciter roller movable forward and backward towards the stationary roller by an exciter actuator; and
   a control device configured to control the exciter roller to control a vibration that is input to a wheel of a vehicle placed on the stationary roller and the exciter roller,
   wherein
   the control device is configured to change a forward and backward stroke length of the exciter roller to change an excitation amplitude, and to change a forward and backward velocity of the exciter roller to change the excitation frequency,
   the vehicle inspection method comprising:
   a wheel placement step of placing the wheel of the vehicle on the stationary roller and exciter roller of the vehicle inspection apparatus, a vibration setting step of setting the vibration that is input to the wheel of the vehicle when abnormal noise generated in the vehicle is detected; and a sweep vibration step of providing a predetermined range of vibrations including the vibration set in the vibration setting step and applying the range of vibrations to the vehicle, and the vibration set in the vibration setting step is set using a frequency and an amplitude, and a range of frequencies including the frequency and a range of amplitudes including the amplitude are provided to provide the range of vibrations in the sweep vibration step.

* * * * *